UNITED STATES PATENT OFFICE.

FRANCISCO LARA, OF MANILA, PHILIPPINE ISLANDS, ASSIGNOR, BY MESNE ASSIGNMENTS, OF ONE-HALF TO E. S. MEKEEL, OF MANILA, PHILIPPINE ISLANDS.

PROCESS OF MAKING SOAP.

1,335,246.  Specification of Letters Patent.  Patented Mar. 30, 1920.

No Drawing.   Application filed April 25, 1918.  Serial No. 230,782.

*To all whom it may concern:*

Be it known that I, FRANCISCO LARA, a citizen of the Philippine Islands, residing at Manila, in the Philippine Islands, have invented certain new and useful Improvements in Processes of Making Soap; and I do hereby declare the following to be a full, clear, and exact description of the invention, such as will enable others skilled in the art to which it appertains to make and use the same.

This invention relates to a new and useful improvement in cleansing fluids, with healing or medicinal properties, and in the process of making the same.

The principal object of the invention is to provide an economical cleansing fluid by mixing different substances in suitable proportions.

A still further object of the invention is that it furnishes a liquid cleanser for cleaning the skin or any other substance without the use of water or of a towel or other drying substance.

A still further object of the invention is that it is healing in its effect upon its application to the unhealthy or diseased skin.

With these and other objects in view, as will appear as the description proceeds, the invention comprehends the various novel features of construction, combination and association of elements or substances as will be fully described hereafter and afterward specifically claimed.

My improved cleansing fluid is preferably prepared as follows:

There are first prepared two combinations, or mixtures, each containing some of the ingredients which go to make up the cleansing and healing liquid constituting the product.

These two combinations will hereinafter be referred to respectively as "No. 1" and "No. 2."

No. 1 is prepared as follows:

Take five parts by volume of silicate of soda and dissolve it in about twenty-five parts by volume of distilled water by the application of heat.

No. 2 is prepared as follows:

Mix together eleven parts by volume of any vegetable oil such as cocoanut oil with an equal amount by volume of animal fat (such as lard).

Apply heat until the two fuse and unite to form a liquid which we will designate as "A."

To the liquid "A" add eleven parts by volume of caustic soda solution having a specific gravity of 1.325.

Mix the caustic soda solution thoroughly with "A" and then let the mixture stand for some hours (according to the temperature of the atmosphere) until it hardens to the consistency of a stone.

When No. 2 has hardened it should be broken up and reduced to a powder. Mix this powder (No. 2) with No. 1 and apply heat.

No. 1 and No. 2 together when so heated form a liquid which we will designate as "B."

Then take the hot liquid ("B") and immediately add thirty-three parts by volume of denatured alcohol of 96% strength, which alcohol has been denatured by the use of pyridin.

By the addition of the alcohol some of the constituents of mixture "B" are immediately precipitated in the form of a paste. Remove this precipitate and there remains a clear liquid which is the cleansing and healing fluid constituting the product.

Having thus fully described my invention what I claim as new, is:

A process of making a cleansing and healing fluid which comprises mixing vegetable oil and animal fat, melting the mixture, adding caustic soda solution and agitating the mixture, allowing the mixture to stand until it hardens, reducing the hardened mass to a powder, adding sodium silicate solution and heating to form a liquid, adding denatured alcohol and removing the precipitate caused thereby.

In testimony whereof I have signed my name to this specification in the presence of two subscribing witnesses.

FRANCISCO LARA.

Witnesses:
F. S. YERGER,
B. I. FLORES.